(12) United States Patent
Frankel et al.

(10) Patent No.: US 10,313,014 B2
(45) Date of Patent: Jun. 4, 2019

(54) HIGH CAPACITY COHERENT OPTICAL TRANSCEIVER FOR SHORT REACH APPLICATIONS

(71) Applicant: Ciena Corporation, Hanover, MD (US)

(72) Inventors: Michael Y. Frankel, Bethesda, MD (US); Vladimir Pelekhaty, Baltimore, MD (US)

(73) Assignee: Ciena Corporation, Hanover, MD (US)

( * ) Notice: Subject to any disclaimer, the term of this patent is extended or adjusted under 35 U.S.C. 154(b) by 29 days.

(21) Appl. No.: 15/718,417

(22) Filed: Sep. 28, 2017

(65) Prior Publication Data
US 2019/0097728 A1   Mar. 28, 2019

(51) Int. Cl.
| H04B 10/50 | (2013.01) |
| H04B 10/516 | (2013.01) |
| H04B 10/572 | (2013.01) |
| H04B 10/61 | (2013.01) |
| G02F 1/21 | (2006.01) |
| H04B 10/40 | (2013.01) |
| G02F 1/225 | (2006.01) |

(52) U.S. Cl.
CPC ......... *H04B 10/40* (2013.01); *H04B 10/5053* (2013.01); *H04B 10/5162* (2013.01); *H04B 10/572* (2013.01); *H04B 10/61* (2013.01); *H04B 10/615* (2013.01); *H04B 10/6161* (2013.01); *G02F 1/225* (2013.01); *G02F 2001/212* (2013.01)

(58) Field of Classification Search
CPC ................ H04B 10/40; H04B 10/5053; H04B 10/5162; H04B 10/572; H04B 10/61; H04B 10/615; H04B 10/6161; G02F 1/225; G02F 2001/212
USPC .......................................................... 398/116
See application file for complete search history.

(56) References Cited

U.S. PATENT DOCUMENTS

| 6,424,444 B1 * | 7/2002 | Kahn ................. H04B 10/5161 |
| | | 398/141 |
| 8,699,880 B2 | 4/2014 | Grigoryan et al. |
| 8,805,206 B2 | 8/2014 | Roberts et al. |
| 9,178,617 B2 * | 11/2015 | Kikuchi ............. H04B 10/2507 |
| 9,900,103 B1 * | 2/2018 | Lee ........................ H04B 10/40 |

(Continued)

OTHER PUBLICATIONS

D.J. Krause, et al "Demonstration of 20-Gb/s DQPSK with a single dual-drive Mach-Zehnder Modulator," IEEE Photon. Techn. Lett., vol. 20, No. 16, Aug. 2008, pp. 1363-1365.

(Continued)

*Primary Examiner* — Dalzid E Singh
(74) *Attorney, Agent, or Firm* — Clements Bernard Walker PLLC; Christopher L. Bernard; Lawrence A. Baratta, Jr.

(57) ABSTRACT

An optical transceiver includes a transmitter including transmitter signal processing circuitry configured to receive a transmit signal and provide two drive voltage signals V1, V2 to a modulator configured to modulate a laser based thereon; and a receiver including i) optical couplers configured to coherently combine received signals with a Local Oscillator (LO) formed by the laser and provide the combined signals to photodetectors for balanced detection, and ii) receiver signal processing circuitry configured to demodulate outputs from the balanced detection, wherein the receiver signal processing circuitry comprises an analog front-end and digital back-end.

20 Claims, 16 Drawing Sheets

(56) References Cited

U.S. PATENT DOCUMENTS

| | | | | |
|---|---|---|---|---|
| 2007/0274731 | A1* | 11/2007 | Boffi | H04B 10/505 |
| | | | | 398/188 |
| 2011/0286747 | A1* | 11/2011 | Lowery | H04B 10/25759 |
| | | | | 398/115 |
| 2015/0117865 | A1* | 4/2015 | Sonoda | H04B 10/07955 |
| | | | | 398/140 |
| 2015/0256265 | A1* | 9/2015 | Chen | H04B 10/58 |
| | | | | 398/197 |
| 2017/0230134 | A1* | 8/2017 | Gavignet | H04B 10/506 |

OTHER PUBLICATIONS

T. Yoshida, et al, "Polar coordinate transformation based dual binary-drive QPSK modulation," paper OMK4 in Optical Fiber Communications Conference 2010 (OFC 2010).

F. Loi, et al, "A 25 Gb/s FIR equalizer based on highly linear all-pass delay stages in 28-nm LP CMOS," paper RTU1D-1, IMS 2015.

M. Xue, et al, "Optical single-sideband modulation based on a dual-drive MZM and a 120☐ coupler," J. Lightwave Techn., vol. 32, No. 19, Oct. 2014, pp. 3317-3323.

http://www.photonics.ece.mcgill.ca/Plant/dvp_pdf/JP-2016-15.pdf and in D. Plant, et al, "Optical communication systems for datacenter networks," OFC 2017, Tutorial W3B.1.

"First Real-Time 400G PAM-4 Demonstration for Inter-Data Center Transmission over 100 km of SSMF at 1550 nm," OFC 2016.

"C-band single wavelength 100-Gb/s IM-DD transmission over 80 km SMF without CF compensation using SSB-DMT," OFC 2015.

"100-Gb/s Hybrid Multiband CAP/QAM Signal Transmission Over a Single Wavelength," J Lightwave Techn., 2015.

Weber & Williams, "400ZR Modulation options," OIF2017.049.01, Jan. 2017.

N. Nambath, et al, "Analog domain signal processing-based low-power 100-Gb/s DP-QPSK receiver," J. Lightwave Techn., vol. 33, No. 15, Aug. 2015, pp. 3189-3197.

M. Ratwani, et al, "Analog domain decision feedback equalizer for repeater-less DP-QPSK coherent optical links," 2016 25th Wireless and Optical Communication Conference.

Z. Li, "SSBI Mitigation and the Kramers-Kronig Scheme in Single-Sideband Direct-Detection Transmission with Receiver-based Electronic Dispersion Compensation," J. Lightwave Techn., vol. 35, No. 10, May 2017, pp. 1887-1893.

F. Gutierrez, et al, "WDM orthogonal subcarrier multiplexing," J. Lightwave Techn., vol. 34, No. 8, Apr. 2016, pp. 1815-1823.

T. Sugihara, et al, "Electronic Predistortion by Polar Coordinate Transformation Using the CORDIC Algorithm," J Lightwave Techn., vol. 27, No. 16, Aug. 15, 2009, p. 3607.

T. Dinc, et al, "A 60 GHz CMOS Full-Duplex Transceiver and Link with Polarization-Based Antenna and RF Cancellation," IEEE Journal of Solid-State Circuits, vol. 51, No. 5, May 2016, p. 1125.

C. Marcu, et al, "A 90 nm CMOS Low-Power 60 GHz Transceiver with Integrated Baseband Circuitry," IEEE Journa of Solid-State Circuits, vol. 44, No. 12, Dec. 2009, p. 3434.

* cited by examiner

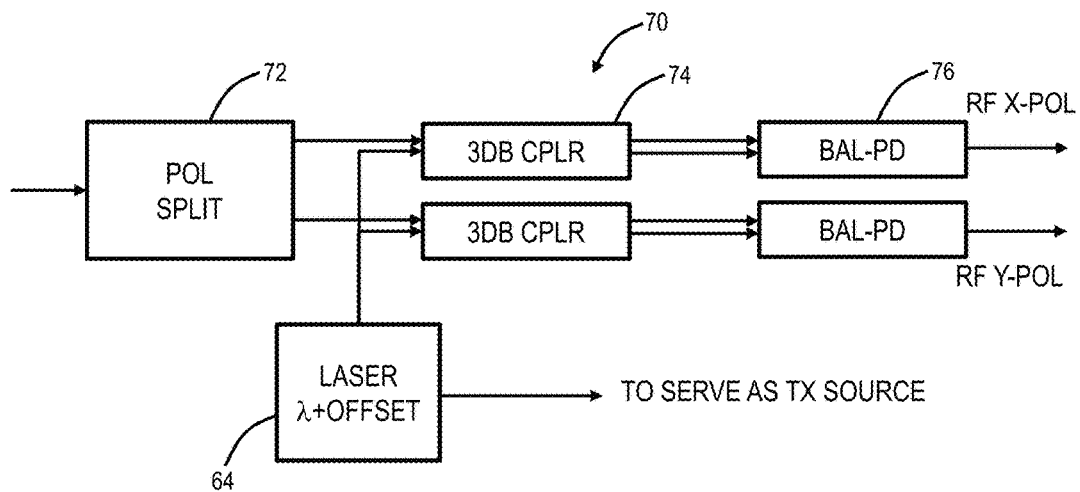
*FIG. 32*
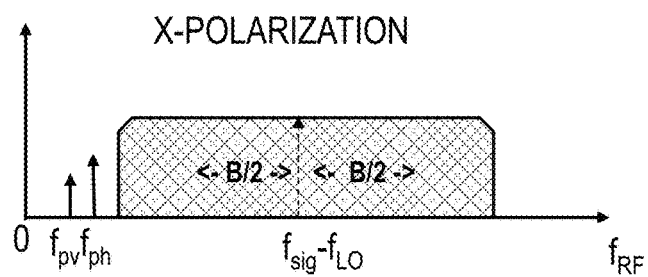
*FIG. 33*
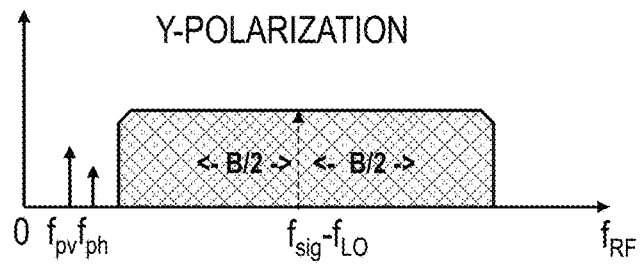

HIGH CAPACITY COHERENT OPTICAL TRANSCEIVER FOR SHORT REACH APPLICATIONS

FIELD OF THE DISCLOSURE

The present disclosure generally relates to optical networking systems and methods. More particularly, the present disclosure relates to a high capacity coherent optical transceiver optimized for short reach applications (e.g., less than 120 km).

BACKGROUND OF THE DISCLOSURE

Optical networks are continuing their exponential capacity growth. Most recent 2017 projections show worldwide fixed internet traffic growing at 23% Compound Annual Growth Rate (CAGR), while mobile traffic which starts at a lower absolute level is projected to grow at 46% CAGR over the next 5 years. Unfortunately for network operators, their revenues are only seeing very modest growth rates. Such bandwidth growth rates are straining network and equipment designs, and can only be realized by combining substantial network architecture changes with more efficient and lower cost equipment designs. Looking at the details of the forces driving bandwidth demands, the dominant component is consumer video at just under 80% of the total and is expected to grow in importance. Further, peak bandwidth is growing faster than average, indicating that consumers are becoming an even more dominant component during specific times of the day. These trends are forcing network architecture evolution to put an increasing amount of content closer to the user at the network edge. This relieves some bandwidth burden in the network core, limits the distance that content has to traverse over networks, and allows substantial amounts of content replication to occur during bandwidth consumption lulls improving overall network utilization efficiency.

These trends increase the importance of optimized high-capacity optical transport designs over shorter distances. High capacity, low power optical links are widely used inside data centers over reaches <2 km and have seen recent scaling from 40 Gbps to 100 Gbps, with development work addressing 400 Gbps designs. Similarly, power and footprint limits placed on individual data center buildings are requiring high capacity low power optical interconnects within data center campus type deployments, with optical reaches on the order of <40 km. The expansion of mobile networks with planned evolution to 5G architectures will require optical links in the <20 km range for front-haul and <80 km range for backhaul type links. Telecom carrier efforts in Central Office Rearchitected as Data Center (CORD) is introducing a similar content processing model more widely across the networks, with the expected desire in high-capacity low power optical links with <80 km reach.

Also, optical transceivers are being standardized to support multiple vendor interoperability through Multisource Agreements (MSAs). Exemplary MSAs for 40G, 100G, 200G, and 400G include C Form-factor Pluggable (CFP) and variants thereof (e.g., CFP2, CFP4, CXP), Quad Small Form-factor Pluggable (QSFP) and variants thereof (e.g., QSFP+, QSFP2, QSFP28, QSFP-DD (Double Density), etc.), Octal Small Form-factor Pluggable (OSFP), and the like. Each MSA defines the transceiver's mechanical characteristics, management interfaces, electrical characteristics, and thermal requirements. Power consumption is becoming a critical factor and is starting to outweigh other considerations in many designs, either directly or indirectly by defining packaging density, cooling complexity, and cost, etc. In particular, transceivers with a target optical reach of <100 km are becoming more critical, and have a requirement to fit into data center pluggable sockets sized for short-reach client interconnect, i.e., MSAs. For example, QSFP28 targets 100 G at <4 W, QSFP-DD targets 200 G and 400 G at <7 W, and OSFP targets 200 G and 400 G at <15 W.

There are a number of approaches that have been explored in academia and industry to address high capacity optical links with approximately 80 km single-hop reach. An example product uses a 28 Gbaud Pulse Amplitude Modulation-4 (PAM4) modulation to provide 80 km reach, with optical dispersion compensation. More sophisticated approaches with more complex DSP are outlined in D. Plant et al., "Optical communication systems for datacenter networks," OFC 2017, Tutorial W3B.1. It is worthwhile to note four approaches that provide a good representation of the current state of the art. A first approach is described in N. Eiselt et al., "First Real-Time 400 G PAM-4 Demonstration for Inter-Data Center Transmission over 100 km of SSMF at 1550 nm," OFC 2016, which shows 8 channels of 50 Gbps PAM4 modulated signal transported over 100 km of Single Mode Fiber (SMF). A second approach introduces more Digital Signal Processing (DSP) complexity as described in L. Zhang et al., "C-band single wavelength 100-Gb/s IM-DD transmission over 80 km SMF without CD compensation using SSB-DMT," OFC 2015, and demonstrates a single channel 100 Gbps over 80 km of SMF using Discrete Multitone Modulation. A third approach, J. Wei et al., "100-Gb/s Hybrid Multiband CAP/QAM Signal Transmission Over a Single Wavelength," J Lightwave Techn., 2015, uses 16-Carrierless Amplitude Phase (CAP) modulation and 16-Quadrature Amplitude Modulation (QAM) to deliver a single 100 Gbps channel over 15 km of SMF. Finally, a fourth approach described in A. Tatarczak et al., "Enabling 4-lane based 400 G client-side transmission links with MultiCAP modulation," also uses a variant of CAP modulation to deliver 100 Gbps channel over 40 km of SMF.

An issue with all of the above approaches is that they sacrifice Optical Signal-to-Noise Ratio (OSNR) tolerance, which limits link margins, optical fiber reach, and demands higher laser optical power. These approaches also have very limited intrinsic chromatic dispersion tolerance, which frequently necessitates external optical dispersion compensation modules.

Therefore, practical industrial applications have focused on more complex fully coherent implementations that provide excellent noise tolerance and full electronic chromatic dispersion compensation. Proposed implementations are discussed as part of the 400 ZR standard in the Optical Internetworking Forum (OIF), as described in Weber and Williams, "400 ZR Modulation options," OIF2017.049.01, January 2017. This implementation relies on a nested I/Q modulator to generate a 16-QAM constellation, and a coherent receiver with a 90-degree optical hybrid front end, and Analog-Digital Converter (ADC)+DSP complex to perform signal recovery and chromatic dispersion compensation in the digital domain. This approach is well understood and tested in the industry but requires extremely expensive deep nm Complementary Metal-Oxide Semiconductor (CMOS) process for ADC+DSP implementation to meet target power budget.

The primary shortcoming of current Intradyne Coherent implementations is high power associated with high-resolution, high sampling rate ADC. Second, complex DSP algorithms are required for extracting frequency, phase, polarization, and clock recovery. Therefore, deep nm CMOS nodes are required such as 7 nm, which results in extremely high Non-Recurring Engineering (NRE) and production costs. Further, narrow linewidth laser is needed to realize required phase/frequency stability, again increasing cost and complexity.

BRIEF SUMMARY OF THE DISCLOSURE

In an embodiment, an optical transceiver includes a transmitter including transmitter signal processing circuitry configured to receive a transmit signal and provide two drive voltage signals V1, V2 to a modulator configured to modulate a laser based thereon; and a receiver including i) optical couplers configured to coherently combine received signals with a Local Oscillator (LO) formed by the laser and provide the combined signals to photodetectors for balanced detection, and ii) receiver signal processing circuitry configured to demodulate outputs from the balanced detection, wherein the receiver signal processing circuitry includes an analog front-end and digital back-end. The modulator can include a Dual-Drive Mach-Zehnder Modulator (DD-MZM) with peak to peak drive voltages of the drive voltage signals V1, V2 sufficient to cover a full unity circle of an I/Q plane. Optical output field transitions across a predefined radial bisection line of the I/Q plane can be prevented by providing the drive voltage signals V1, V2 to force null transmission, wherein the transmitter signal processing circuitry is configured to re-set the drive voltage signals V1, V2 for the null transmission. The transmitter signal processing circuitry can be configured to apply chromatic dispersion compensation on the transmit signal.

The transmitter signal processing circuitry can be configured to add pilot tones to the transmitted signal, outside of signal spectrum and on opposite sides of the signal spectrum from an adjacent optical transceiver. A first pilot tone of the pilot tones can be at a fractional N/K of symbol clock outside of the signal spectrum, N and K are integers selected to place the pilot tones slightly outside of the signal spectrum, and a second pilot tone of the pilot tones, orthogonal to the first pilot tone, can be at (N+1)/K of the symbol clock outside of the signal spectrum. The laser can have a frequency offset based on signal bandwidth to provide a signal carrier for reuse as the LO. The analog front-end can include Transimpedance Amplifiers (TIAs) and analog Radio Frequency (RF) processing functions integrated into a same circuit. The analog front-end can be configured to down-convert pilot tones on the received signals and directly synthesize a Radio Frequency (RF) LO signal for signal conversion to baseband with corresponding recovery of frequency and phase offsets.

The analog front-end can be configured to down-convert pilot tones on the received signals and directly synthesize a symbol clock signal. The analog front-end can be configured to down-convert pilot tones on the received signals and directly synthesize a polarization deconvolution matrix. The analog front-end can be configured to down-convert the received signals to baseband and extract I and Q components. The analog front-end can include Finite Impulse Response (FIR) filters for partial compensation of chromatic dispersion compensation, in combination with the transmitter signal processing circuitry of an adjacent optical transceiver. Unused FIR filter taps in the analog front-end can be shut down to conserve power. An Analog to Digital Converter (ADC) stage can be between the analog front-end and the digital back-end, wherein the ADC stage operates at a symbol rate. An Effective Number of Bits (ENOB) of the ADC stages can be limited to provide hard decision slicing of a symbol constellation. The digital back-end can include a Digital Signal Processor (DSP) configured to perform signal decoding and Forward Error Correction (FEC) decoding. The transmitter and the receiver can be housed in a housing compliant to one of Quad Small Form-factor Pluggable (QSFP) Double Density (DD) and Octal Small Form-factor Pluggable (OSFP).

In another embodiment, a method for an optical transceiver includes providing a transmitter including transmitter signal processing circuitry configured to receive a transmit signal and provide two drive voltage signals V1, V2 to a modulator configured to modulate a laser based thereon; and providing a receiver including i) optical couplers configured to coherently combine received signals with a Local Oscillator (LO) formed by the laser and provide the combined signals to photodetectors for balanced detection, and ii) receiver signal processing circuitry configured to demodulate outputs from the balanced detection, wherein the receiver signal processing circuitry includes an analog front-end and digital back-end.

In a further embodiment, an optical transceiver for low power applications includes a transmitter including transmitter signal processing circuitry configured to receive a transmit signal and provide two drive voltage signals V1, V2 to a Dual-Drive Mach-Zehnder Modulator (DD-MZM) modulator configured to modulate a laser based thereon; and a receiver including i) optical couplers configured to coherently combine received signals with a Local Oscillator (LO) formed by the laser and provide the combined signals to photodetectors for balanced detection, and ii) receiver signal processing circuitry configured to demodulate outputs from the balanced detection, wherein the receiver signal processing circuitry includes an analog front-end and digital back-end, and wherein the receiver signal processing circuitry and the transmitter signal processing circuitry perform compensation of chromatic dispersion and distortion due to the DD-MZM in conjunction with an adjacent optical transceiver's receiver signal processing circuitry and transmitter signal processing circuitry.

BRIEF DESCRIPTION OF THE DRAWINGS

The present disclosure is illustrated and described herein with reference to the various drawings, in which like reference numbers are used to denote like system components/method steps, as appropriate, and in which:

FIG. 32 is a block diagram of a heterodyne coherent receiver for the receiver;

FIG. 33 is a spectrum diagram illustrating a shift of the optical spectrum to intermediate frequency by the heterodyne coherent receiver.

DETAILED DESCRIPTION OF THE DISCLOSURE

In various embodiments, the present disclosure relates to a high capacity coherent optical transceiver optimized for short reach applications (e.g., less than 100 km) with the objective of providing a low-cost, low-power, high-performance coherent optical transceiver for data center interconnect, access, 5G backhaul, and the like. An optical transceiver includes a transmitter including precompensation circuitry configured to receive a transmit signal and provide two drive voltage signals V1, V2 to a modulator configured to modulate a laser based thereon; and a receiver including i) optical couplers configured to coherently combine received signals with a Local Oscillator (LO) formed by the laser and provide the combined signals to photodetectors for balanced detection, and ii) signal processing circuitry configured to demodulate outputs from the balanced detection, wherein the signal processing circuitry includes an analog front-end and digital back-end. The coherent optical transceiver is designed to optimize performance on a single link, e.g., short reach (<2 km) up to long reach/extended long reach (<120 km), while minimizing cost, footprint, and power.

Figure 1:
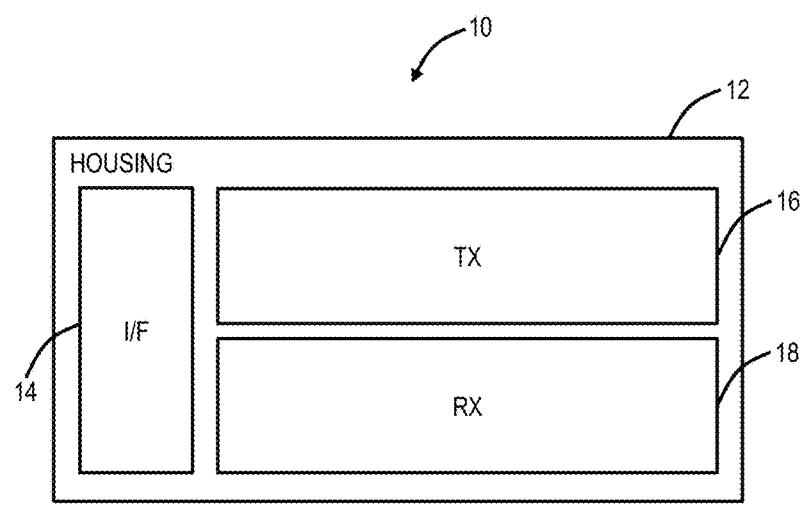
FIG. 1 is a block diagram of a high capacity coherent optical transceiver of the proposed solution.

FIG. 1 is a block diagram of a high capacity coherent optical transceiver 10 of the proposed solution. The coherent optical transceiver 10 includes a housing 12, an electrical interface 14, a transmitter (Tx) 16, and a receiver (Rx) 18. The coherent optical transceiver 10 can be a pluggable module and can support 100 Gbps, 400 Gbps, and beyond with distances of up to 100 km. The housing 12 can be compliant to an MSA, such as CFP, QSFP-DD, OSFP, etc. The electrical interface 14 provides electrical connectivity (data and power) to a host device (not shown), and the electrical interface 14 can also be compliant to an MSA. The transmitter 16 and receiver 18 provide the optical interfaces and are discussed in detail herein. As mentioned herein, conventional approaches either use scaled down PAM schemes which have optical limitations and increased power requirements or more complex fully coherent implementations that provide excellent noise tolerance and full electronic dispersion compensation, but have high costs for this particular application. The coherent optical transceiver 10 seeks to provide an implementation optimal to high-capacity, short reach application avoiding the limitations of the scaled down PAM schemes and the high cost/power of the complex full coherent implementations.

In particular, the coherent optical transceiver 10 can utilize Dual Drive (DD) modulation in the transmitter 16 with modifications, a partition of the receiver 18 into an analog Front End (FE) and digital Back End (BE), and pilot tones in each polarization for signal recovery. This implementation optimizes the cost and power to support 100 Gbps+ optical transmission for distances up to 100 km.

The receiver 18 implements a heterodyne approach with a simple 2×2 coupler instead of a conventional 90-degree optical hybrid. An optical Local Oscillator (LO) signal is added at the receiver 12 to enable dual-polarization data transmission. The optical complexity and loss are reduced (½ photodetectors/Transimpedance Amplifier (TIA), simpler optical coupler, lower laser power) but at the expense of 2× wider Radio Frequency (RF) photodetector/TIA bandwidth.

Also, a pilot tone is added by the transmitter 16 on each polarization to assist the receiver 18 in the recovery of optical signal polarization, the LO phase/frequency and to simplify symbol clock recovery. Advantageously, a more cost-effective laser with a wider linewidth can be used in this implementation. The receiver 18 optical LO is used on the same side of the spectrum as received pilots, which reduces pilot mixer frequency demands. Opposite ends of the link position pilots on the opposite sides of the data signal spectrum, and provide lasers offset by an amount greater than signal bandwidth, such that the same laser can be used for both transmission 16 source and receiver 18 LO.

The receiver 18 can be further partitioned into an Analog RF front-end which performs signal conversion to baseband, polarization demultiplexing, phase/frequency/clock recovery, and some Finite Impulse Response (FIR) signal filtering for dispersion and RF channel compensation. The TIA can be included as an additional analog block on the same die as the analog signal processor. This both reduces cost and power and improves RF signal transmission quality from TIA to the down-converting mixer block. The digitization (ADC) and decision slicing occur with no oversampling and minimal Effective Number of Bits (ENOB), simplifying processing and reducing DSP cost and power consumption (i.e., the receiver-side FIR filter can be implemented in analog domain before the ADC).

The transmitter 16 provides partial Chromatic Dispersion (CD) pre-compensation and uses dual-drive (DD) modulator. The DD modulator has lower optical insertion loss compared to a more conventional Dual Nested I/Q modulator which is beneficial for limited reach applications. An optimized partitioning of FIR filtering between the transmitter 16 and the receiver 18 allows an overall reduction in complexity, and a reduction in Peak to Average Power Ratio (PAPR) on the transmitter 16 side (important for reducing optical loss). The coherent optical transceiver 10 uses a novel signal processing approach to provide dispersion pre-compensation using a DD-Mach-Zehnder Modulator (MZM). The approach offsets signal spectrum in the I/Q plane, and forces pre-distorted signal to go through zero rather than undergo negative I axis crossing. This approach eliminates problems with runaway drive voltage, albeit at the expense of a small Signal-to-Noise Ratio (SNR) degradation.

Modulation

Figure 2:
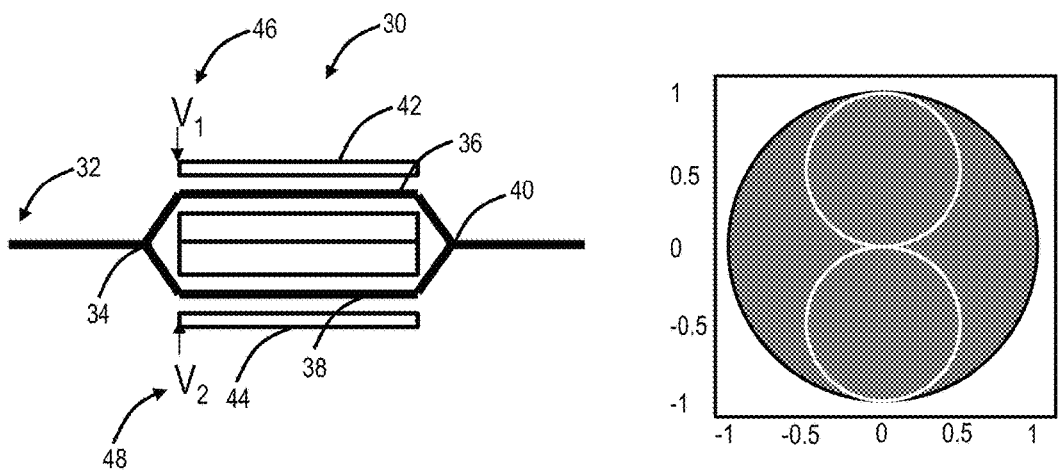
FIG. 2 is a diagram of a Dual Drive Mach-Zehnder Modulator (DD-MZM) and a graph of portion of I/Q plane accessible with a zero-biased modulator driven by a 2*Vπ peak-to-peak voltage (white circles show access by individual drives alone)

M-ary Quadrature Amplitude Modulation (M-QAM) modulation can be implemented in various ways. The preferred embodiment uses a Dual-Drive Mach-Zehnder modulator (DD-MZM), although a nested I/Q modulator could also be used. FIG. 2 is a diagram of a DD-MZM 30 and a graph of the portion of I/Q plane accessible with a modulator driven with a $2*V\pi$ peak-to-peak voltage. The DD-MZM 30 includes an optical input 32 connected to an optical divider 34 which splits the input 32 to two optical arms 36, 38 which are arranged in parallel between the optical divider 34 and an optical combiner 40. The DD-MZM 30 includes a first phase-shifting device 42 and a second phase-shifting device 44 acting respectively on the optical arms 36, 38 for changing the optical phase of an optical signal traveling respectively in the optical arms 36, 38. The phase-shifting devices 42, 44 can be electrodes. The DD-MZM 30 includes a first drive voltage 46 (V1) and a second drive voltage 48 (V2) connected respectively to the phase-shifting devices 42, 44.

The DD-MZM 30 has the advantage of lower optical complexity and lower optical insertion loss (by ~3 dB under ideal conditions without pre-distortion) compared to the nested I/Q modulator. Given the right combination of drive voltages 46, 48, the full transmission circle in I/Q plane for complex signal generation is accessible, as shown in the graph in FIG. 2, assuming delivery of the drive voltages 46, 48 up to $2V\pi$ peak-to-peak.

Now, consider the constellations that can be generated using the DD-MZM 30. The prior art has shown constellations with some limitations. For example, D. J. Krause et al. in "Demonstration of 20-Gb/s DQPSK with a single dual-drive Mach-Zehnder Modulator," IEEE Photon. Techn. Lett., vol. 20, no 16, August 2008, pp. 1363-1365 shows Quadrature Phase Shift Keying (QPSK) with a single DD-MZM, but a full I/Q plane unity circle was not accessible. A different constellation was demonstrated by T. Yoshida et al. in "Polar coordinate transformation based dual binary-drive QPSK modulation," paper OMK4 in Optical Fiber Communications Conference 2010 (OFC 2010) showing substantial asymmetry under binary modulation, and requiring Return-to-Zero (RZ) carving. Further, it appears that these simulations did not properly scale the generated electric field, which cannot exceed an absolute magnitude of 1, assuming it is normalized to the input electric field (i.e., the modulator cannot produce optical gain).

Figure 3:
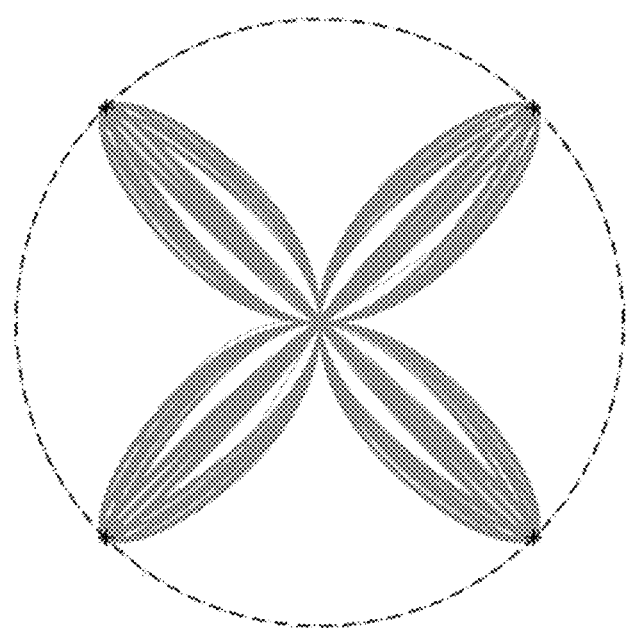
FIG. 3 is a constellation diagram of a Quadrature Phase Shift Keying for the DD-MZM with drive voltage up to 2Vπ peak-to-peak.

In the approach for the coherent optical transceiver 10, the DD-MZM 30 is driven with a larger drive voltage up to $2V\pi$ peak-to-peak. Since modern modulators are quite efficient, these drive voltage 46, 48 levels are still fully compatible with CMOS based circuits. The generated QPSK constellation is illustrated in FIG. 3 and can address the full unity transmission circle in I/Q plane and produce negligible modulator loss at the symbol centers, placing these points on a unity circle (i.e., zero modulation loss). Notice, that the DD-MZM 30 produces a RZ-like QPSK signal with much-reduced chirp without use of RZ carving, as in Yoshida et al., but by forcing the transition between the symbols through the origin via sampling V1 and V2 so that they differ by $V\pi$ at sampling point in between the symbols.

Of course, introducing pre-compensation for chromatic dispersion is well known to increase signal Peak to Average Power Ratio (PAPR). As such, modulation drive signals corresponding to undistorted signal have to be reduced proportionally to prevent pre-distorted signal clipping. This effect is true regardless of the modulator structure and applies to dual nested I/Q modulator as well as to the DD-MZM 30. However, given that the DD-MZM 30 starts out having 3 dB lower insertion loss, the 30 DD-MZM benefit persists.

Figure 4:
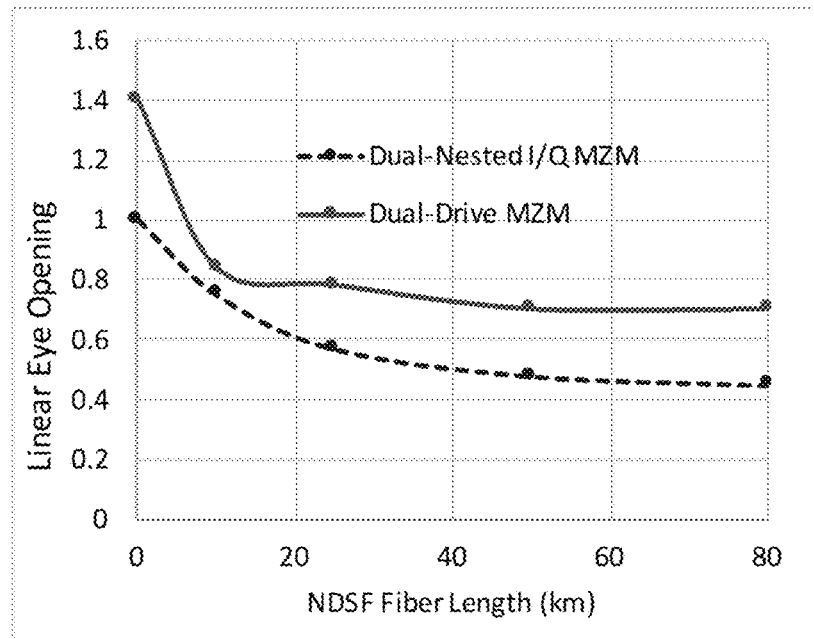
FIG. 4 is a graph of computed eye opening at the receiver of the DD-MZM compared to a dual-nested I/Q MZM, assuming full pre-compensation of chromatic dispersion for both modulator types.
Figure 5:
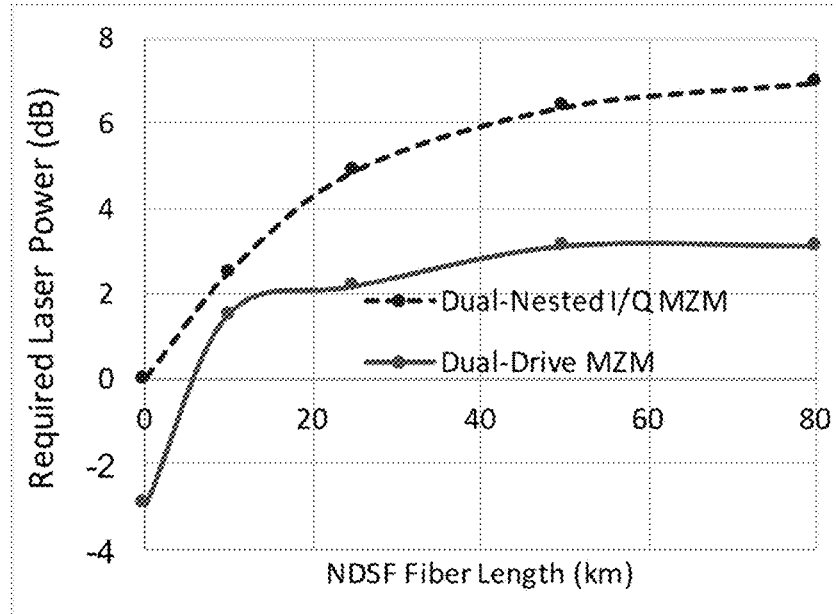
FIG. 5 is a graph of the required laser power of the transmitter for the DD-MZM compared to a dual-nested I/Q MZM.

FIG. 4 is a graph of computed eye opening at the receiver 18 of the DD-MZM 30 compared to a dual-nested I/Q MZM, assuming full pre-compensation of chromatic dispersion for both modulator types. FIG. 5 is a graph of the required laser power of the transmitter 16 for the DD-MZM 30 compared to a dual-nested I/Q MZM. It should be noted that optical Amplified Stimulated Emission (ASE) noise is additive for a coherent receiver 18 and optical power is proportional to the square of the electric field. Therefore, to get the same receiver SNR, if the electric field is reduced by 0.7, one would require 3 dB higher optical power from the laser. The impact of tolerable signal clipping has been neglected in this simplified analysis but is not expected to produce qualitatively different results. While required laser power grows with increasing pre-compensation, average modulator driving voltage decreases, reducing this component of power consumption.

Of course, the DD-MZM 30 introduces an additional limitation on the pre-compensated signal. While the full I/Q plane is accessible, transitions between II and III quadrants across the negative I-axis are prohibited, given the constraints on the drive voltage. The drive voltages 46, 48 have to be reset to force the transition across negative I-axis through the origin, if this transition is required, and this is a key innovative concept on the transmitter 16 using the DD-MZM 30. This prevents excessive growth of required drive voltages 46, 49.

It turns out that such transitions depend on the amount of chromatic dispersion being compensated, with higher amounts of compensation producing more frequent negative I-axis crossings. At the same time, suppressing such crossings by a forced reset introduces some signal distortion. In order to limit signal distortion, the constellation is offset to more positive I axis values. This reduces signal distortion penalties, at the expense of a moderate increase of modulation loss.

Figure 6:
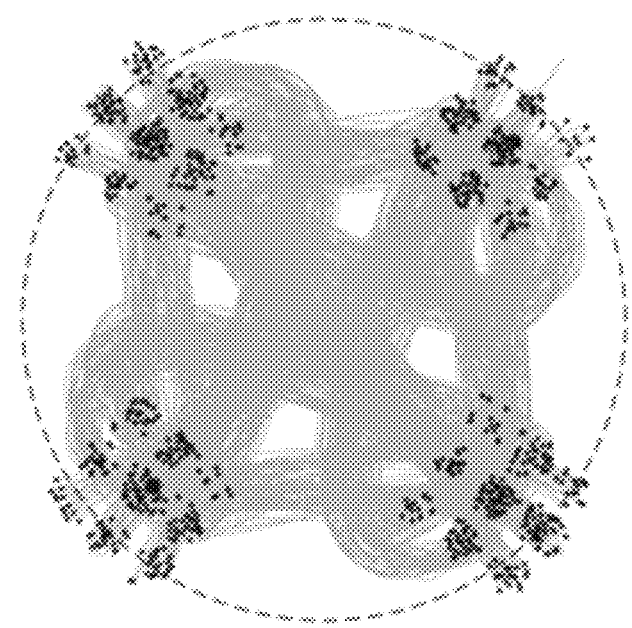
FIG. 6 is an I/Q plane and FIG. 7 is eye diagrams after 5 km Non-Dispersion Shifted Fiber (NDSF) distance assuming a 31 Gbaud QPSK signal with no pre-distortion (tops: $Q^2$ in dBs)
Figure 7:
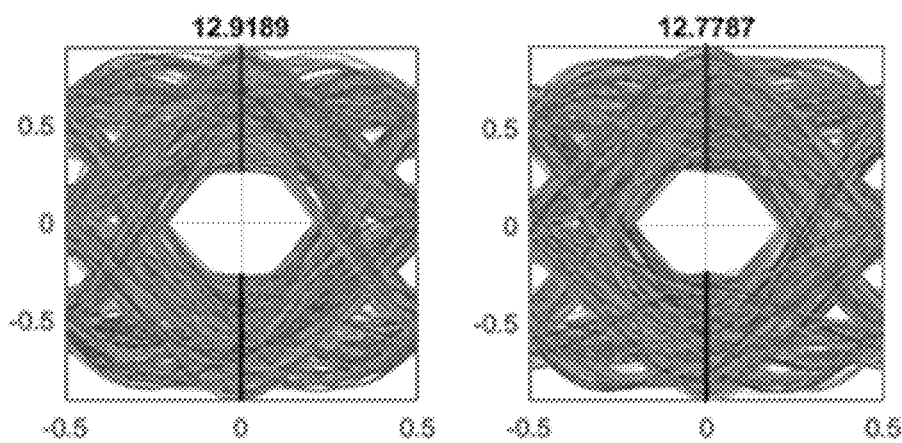

FIGS. 6-29 include various diagrams of the I/Q plane, eye diagrams, and FIR taps on the transmitter 16 and the receiver 18 for the DD-MZM 30. FIG. 6 is an I/Q plane and FIG. 7 is eye diagrams after 5 km Non-Dispersion Shifted Fiber (NDSF) distance assuming a 31 Gbaud QPSK signal with no pre-distortion. Clearly, such signal distortions are not acceptable, and some amount of chromatic dispersion compensation would be required even at such modest distances. $Q^2$ factor in dB is indicated for the eye diagrams in FIG. 7, assuming an ideal demodulator, and are below 13 dB (namely 12.9189 dB for I and 12.7787 dB for Q channels).

Figure 8:
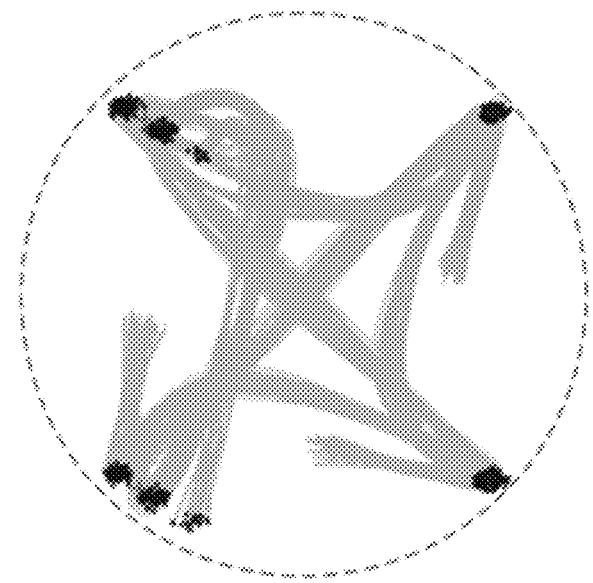
FIG. 8 is an IQ plane.
Figure 9:
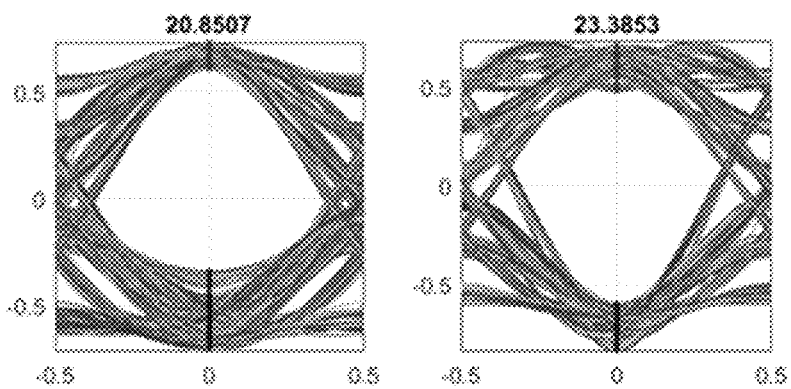
FIG. 9 is eye diagrams (tops: $Q^2$ in dBs)
Figure 10:
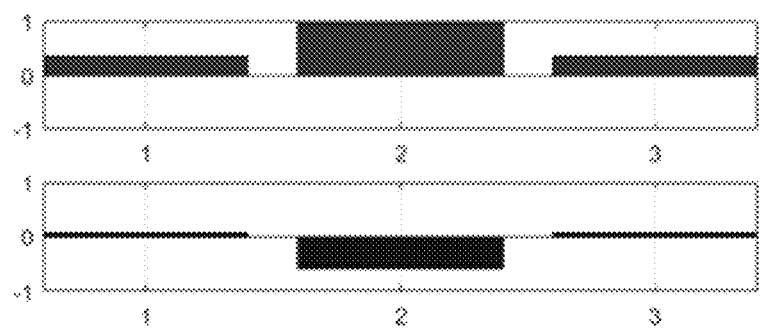
FIG. 10 is a bar-graph of normalized values of for 3 Finite Impulse Response (FIR) taps (top: real; bottom: imaginary) for 5 km Non-Dispersion Shifted Fiber (NDSF) distance assuming a 31 Gbaud QPSK signal with pre-distortion via the 3-taps FIR filter

A small amount of chromatic dispersion, for example, 5 km worth, can be pre-compensated without constellation offset with 3 FIR taps on the transmitter 16. FIG. 8 is an I/Q plane, FIG. 9 is eye diagrams, and FIG. 10 is a graph of 3 FIR taps for 5 km Non-Dispersion Shifted Fiber (NDSF) distance assuming a 31 Gbaud QPSK signal with pre-distortion via the 3 FIR taps. This shows that 3 FIR taps are sufficient for 5 km of fiber. The $Q^2$ factor in dB is indicated for the eye diagrams (namely 20.8507 and 23.3853), assuming an ideal demodulator.

Figure 11:
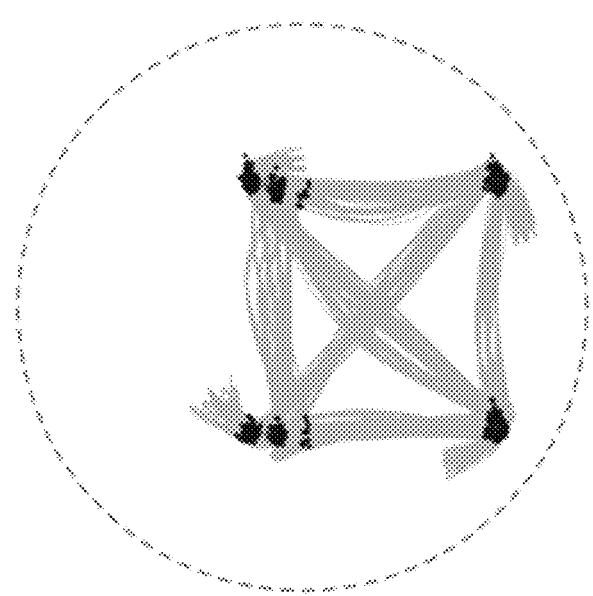
FIGS. 11, 12, and 13 are an I/Q plane, eye diagrams, and FIR taps as fiber distance increases to 9 km NDSF, a constellation offset of ¼ is introduced, and the FIR in the transmitter is expanded to 5 taps.
Figure 12:
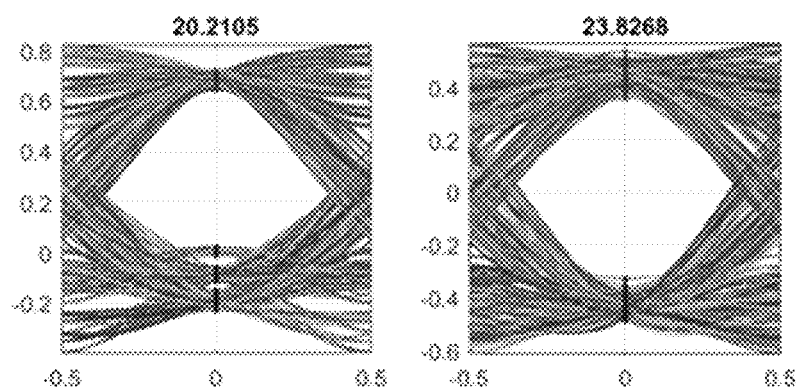
Figure 13:
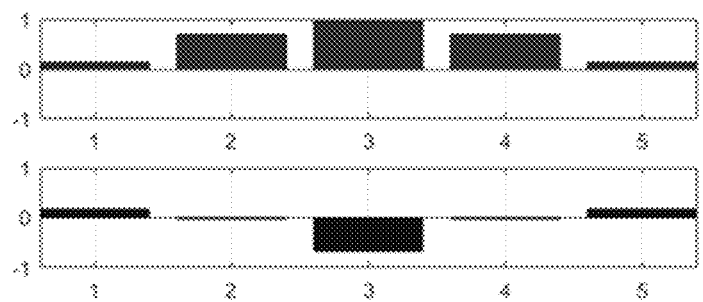
Figure 14:
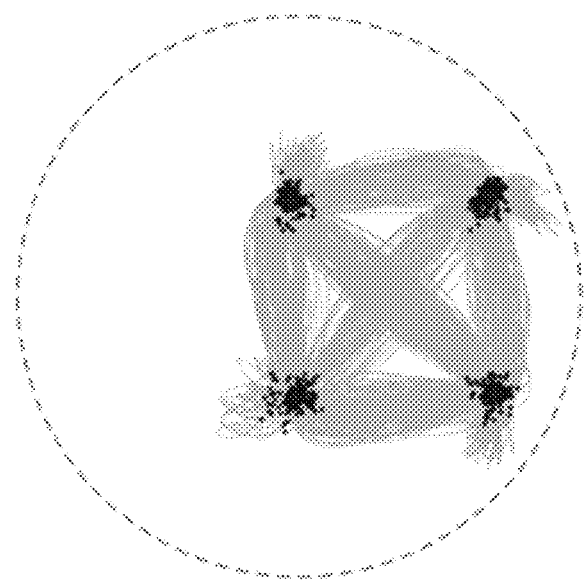
FIGS. 14, 15, and 16 are an I/Q plane, eye diagrams, and FIR taps as fiber distance increases to 25 km NDSF, a constellation offset to ⅓ is introduced, and the FIR filter in the transmitter is expanded to 9 taps.
Figure 15:
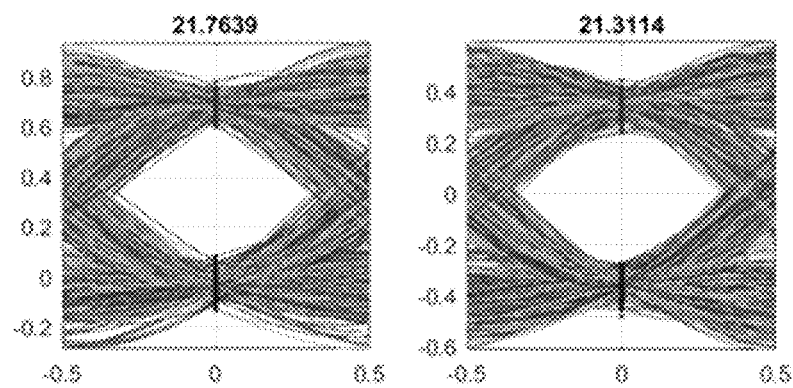
Figure 16:
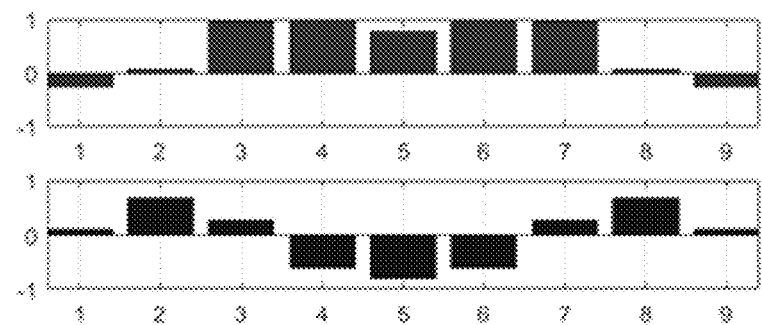

In FIGS. 11, 12, and 13, as fiber distance increases to 9 km NDSF, a constellation offset of ¼ is introduced, and the FIR filter in the transmitter 16 is expanded to 5 taps. In FIGS. 14, 15, and 16, as fiber distance increases to 25 km NDSF, a constellation offset to ⅓ is introduced, and the FIR filter in the transmitter 16 is expanded to 9 taps.

Figure 17:
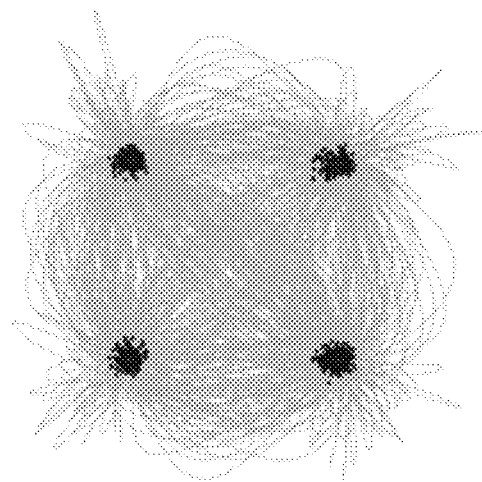
FIGS. 17, 18, and 19 are an I/Q plane, eye diagrams, and FIR taps demonstrating that the coherent optical transceiver can compensate a total of 80 km, by partitioning compensation between 11 FIR transmitter taps and 13 FIR receiver taps.
Figure 18:
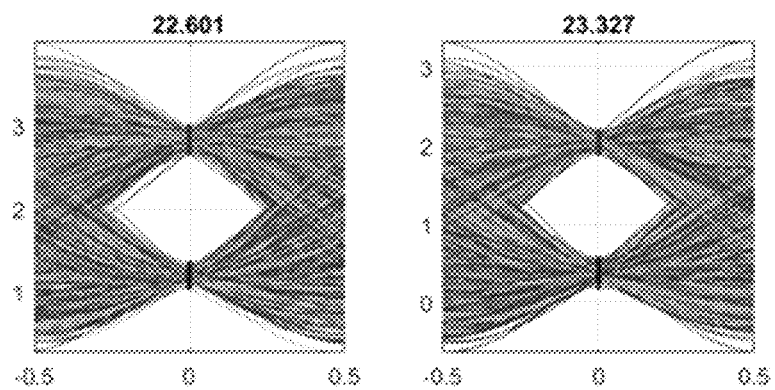
Figure 19:
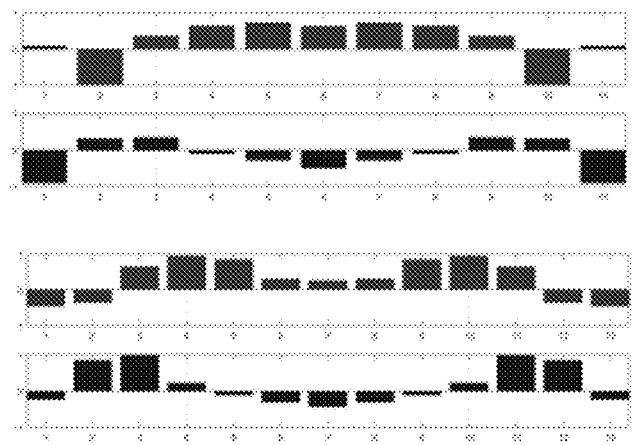

If roughly half of 80 km is pre-compensated at the transmitter 16, an offset of ½ is needed, which implies that the original constellation is fully in the right half of the I/Q plane. In FIGS. 17, 18, and 19, it has been demonstrated that the coherent optical transceiver 10 can compensate a total of 80 km, by partitioning compensation between 11 FIR transmitter taps and 13 FIR receiver taps. It should be pointed out the effect that can be observed by comparing the transmitter and receiver side FIR taps. These filters do not directly compensate for equal amounts of fiber dispersion, but rather form filter responses that cooperatively compensate for both DD-MZM transmission distortions and fiber dispersion.

Figure 20:
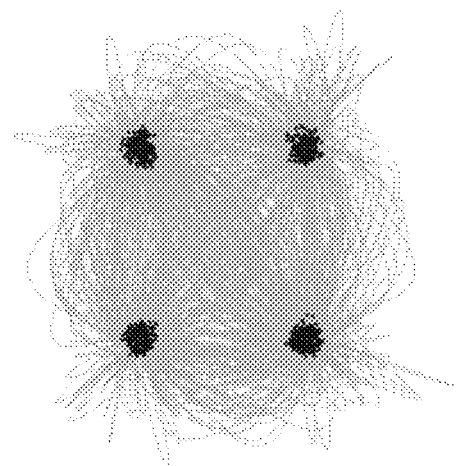
FIGS. 20, 21, and 22 are an I/Q plane, eye diagrams, and FIR taps demonstrating full chromatic dispersion compensation can be achieved at the receiver; however, the receiver now requires 21 FIR taps for 80 km of fiber.
Figure 21:
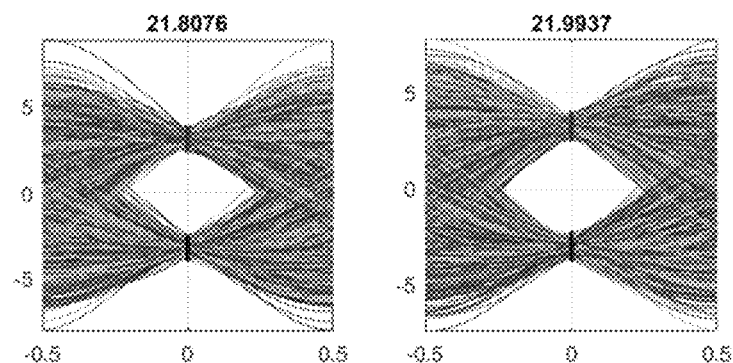
Figure 22:
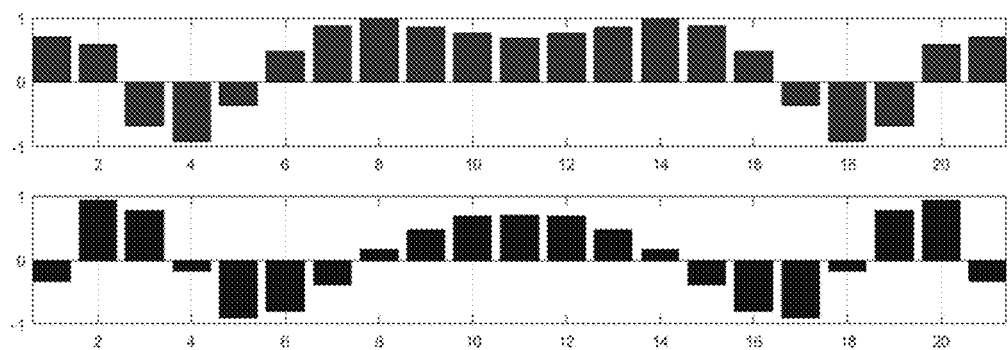

Note, full chromatic dispersion compensation can be achieved at the receiver 18 as in FIGS. 20, 21, and 22. This relieves the pre-compensation burden at the transmitter 16 and reduces modulation loss. However, the receiver 18 now requires 21 FIR taps for 80 km of fiber.

Figure 23:
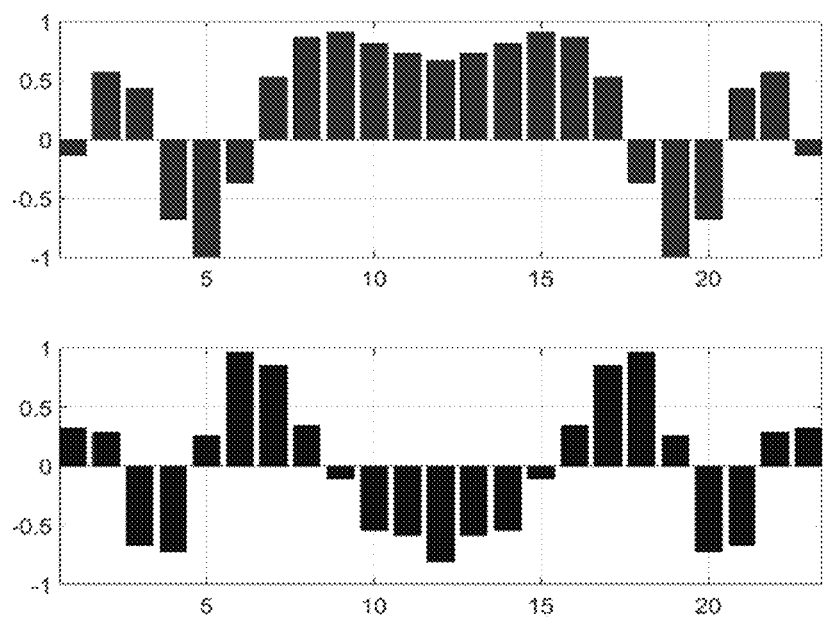
FIG. 23 illustrates that 23 FIR taps are sufficient to compensate for 80 km of NDSF for a 31 GBaud QPSK signal (offset=½)

Chromatic dispersion compensation was also tested by being performed completely in the transmitter 16. FIG. 23 shows that 23 FIR taps are sufficient to compensate for 80 km of NDSF for a 31 GBaud QPSK signal (offset=½). In reality, there are only 11 distinct taps (due to symmetry), and the FIR filter can be shortened accordingly. A further simplification can be achieved by partitioning the FIR filter between transmitter 16 and receiver 18 sections, with the receiver 18 section implemented in the analog domain.

Figure 24:
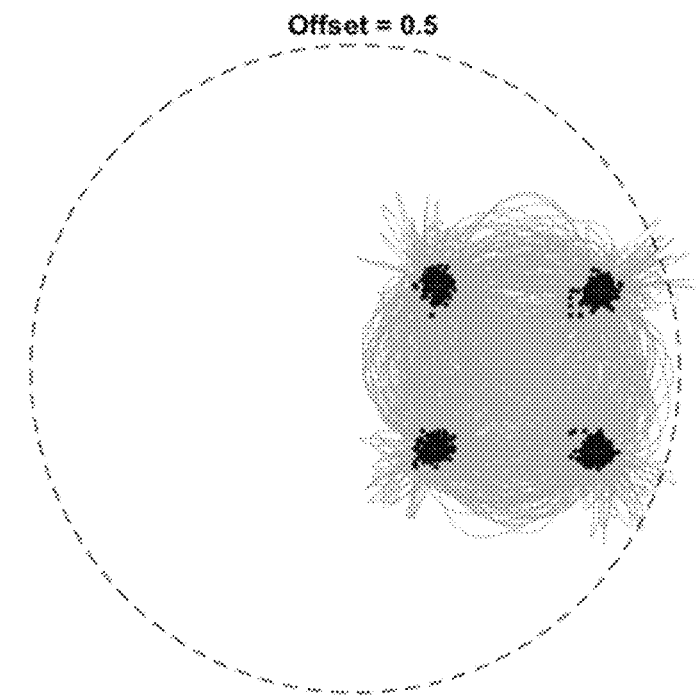
FIGS. 24 and 25 are an I/Q plane and eye diagrams illustrating the signal constellation with an offset of ½ and eye diagrams (I and Q) after 80 km of NDSF.
Figure 25:
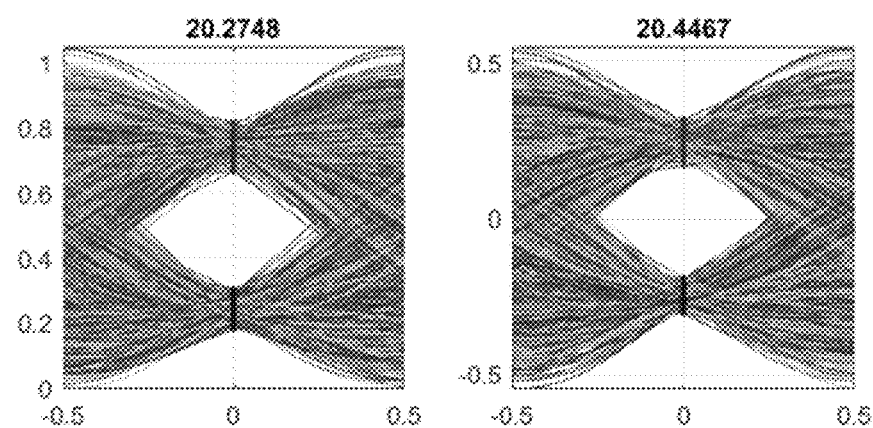
Figure 26:
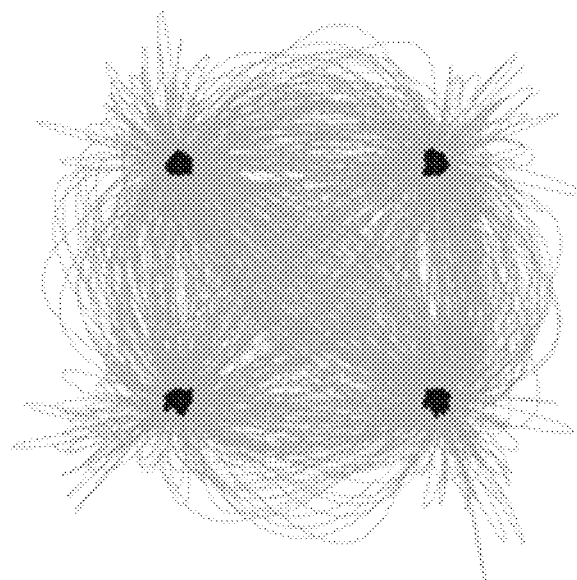
FIGS. 26-29 are an I/Q plane, eye diagrams, and FIR taps illustrating the assistance of 3 transmitter taps to allow for 21 receiver taps to do the better job with $Q^2$ being better than 28 dB versus less than 22 dB with purely receiver-side FIR.
Figure 27:
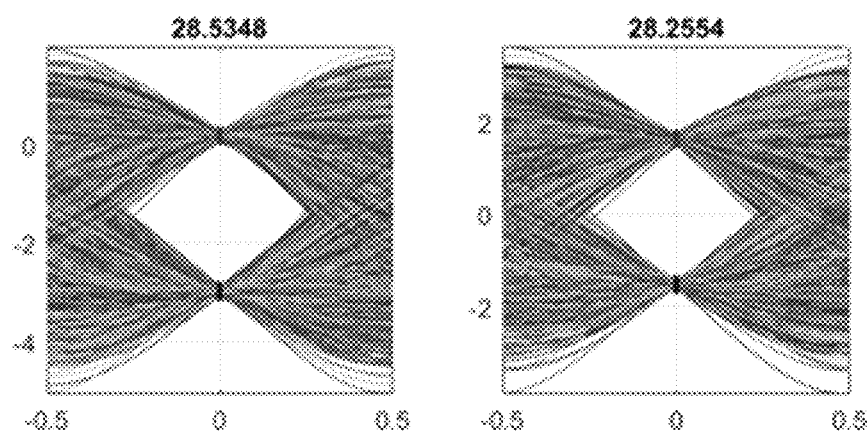
Figure 28:
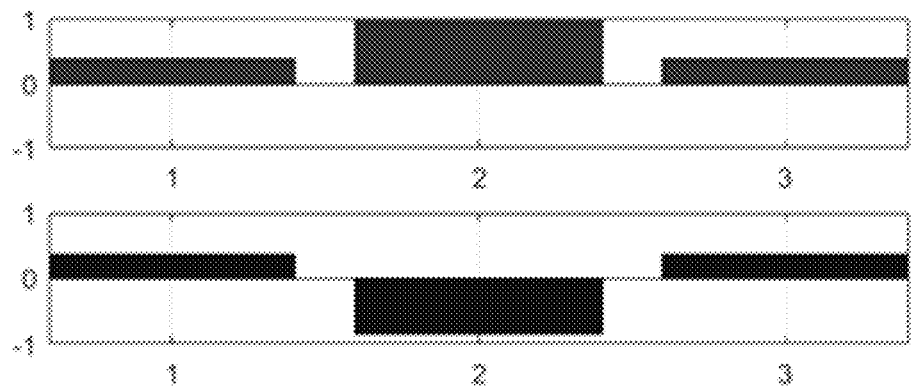
Figure 29:
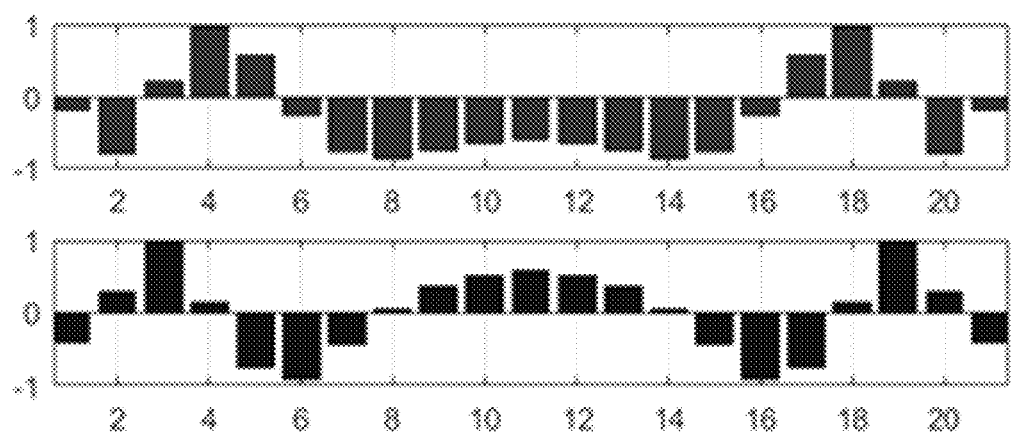

FIGS. 24 and 25 illustrate the signal constellation with an offset of ½ and eye diagrams (I and Q) after 80 km of NDSF.

The cooperative nature of transmitter 16 and receiver 18 FIR filters was further explored. FIGS. 26-29 illustrate the assistance of 3 transmitter taps to allow for 21 receiver taps to do the better job with $Q^2$ being higher than 28 dB versus less than 22 dB with purely receiver-side FIR.

Fundamentally, there is a trade-off in complexity, cost, and power when considering the amount of transmitter DSP and Digital-to-Analog Converter (DAC), and receiver analog/digital partitioning. The coherent optical transceiver 10 can avoid using transmitter-side DSP and DAC only when three conditions are simultaneously true (DAC-less binary driven DD-MZM is also possible, but still requires signal precoding), namely i) modulation format with binary drive (i.e., QPSK), ii) dual-nested I/Q modulator is used, and iii) the transmitter pre-compensation requires a small number of FIR filters realizable in the analog domain.

However, the laser power is a significant fraction of the total in current transceiver technologies and FIG. 5 indicates that minimizing transmitter pre-distortion is a preferred strategy. At the same time, it is preferable to avoid ADC conversion and receiver-side DSP to reduce power and complexity, which requires an analog FIR filter implementation. It should also be noted that analog FIR filter taps can be preferentially powered down if not needed, reducing power consumption at lower distances, while ADC-based implementations are largely fixed power. Receiver-side chromatic dispersion compensation will require ~21-tap FIR filters. Due to inherent symmetry, these can be reduced to 4 real 11-tap FIR filters per polarization. F. Loi et al., "A 25 Gb/s FIR equalizer based on highly linear all-pass delay stages in 28-nm LP CMOS," paper RTU1D-1, IMS 2015, demonstrate a 4-tap CMOS FIR filter at 25 Gbps with 12 mW (~3 mW/tap), and 14 mW for output driver stage. Scaling to 8 11-tap FIR filters, the power consumption of 264 mW can be expected, excluding output driver stages.

Thus, in a preferred embodiment, the coherent optical transceiver 10 includes the following design elements: i) the DD-MZM 30 which requires lower laser powers across all transmitter 16 pre-distortion settings, ii) approximately 80 km chromatic dispersion coverage using receiver 18 side analog FIR filters (and the FIR taps can be powered down at lower distances), and iii) pre-coding DSP and DAC at transmitter enabling various modulation formats and up to 50 km of pre-compensation.

This design approach allows coverage of multiple markets/applications by selective enabling of functional blocks, namely:

1) Short reach clients, <2 km with small transmitter 16 pre-compensation and disabling the receiver analog FIR;

2) 10 km Long Reach (LR) up to 80 km Extended Reach (ER) which is achieved by gradual enabling additional receiver FIR taps; and 3) 120 km Ultra Long Reach (ZR) which is achieved by higher laser power, full transmitter pre-compensation, and full receiver post-compensation.

Depending on overall design choices, it is possible to implement 400 Gbps modules in a QSFP-DD package for cases 1) and 2), and an OSFP package for case 3).

Transmitted Signal Spectrum with Pilots

Figure 30:
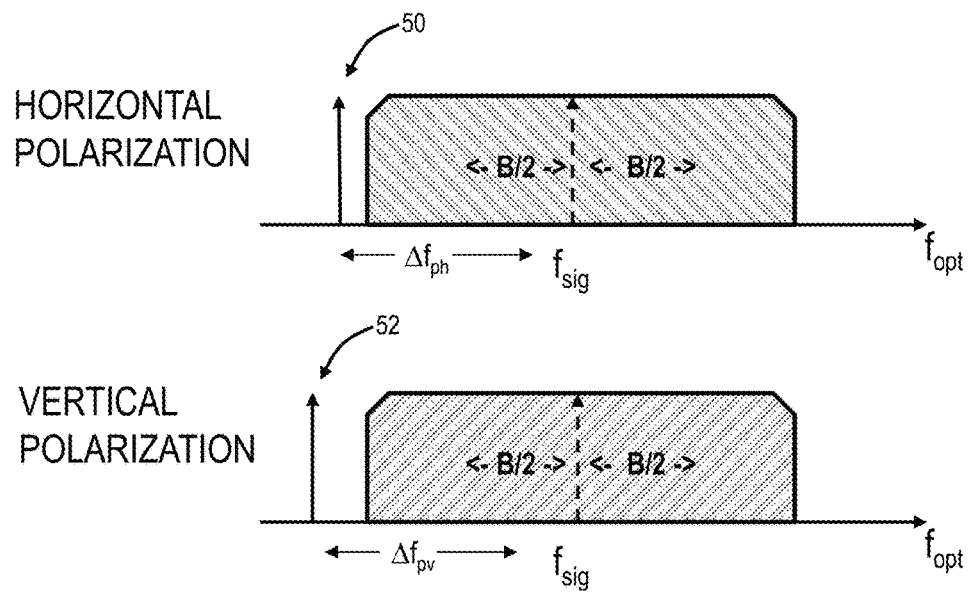
FIG. 30 is a spectrum diagram illustrating pilot tones generated with different offsets on 'h' and 'v' polarizations.

The transmitter 16 generates a transmitted signal with a conventional M-QAM format. Other possibilities such as subcarrier multiplexed, Optical Frequency Division Multiplexed (OFDM), etc. approaches could be considered, but are likely to introduce more overall complexity. In addition to the signal of baud rate B, the transmitter 16 also generates pilot tones with different offsets on 'h' and 'v' polarizations, as shown in FIG. 30.

The offsets for the pilot tones 50, 52 can be linked to the baud rate B as follows:

$\Delta f_{ph} = N/K * B$, horizontal pilot fractionally offset from baud rate $B$ $\Delta f_{pv} = (N+1)/K * B$, vertical pilot fractionally offset from baud rate $B$ The pilot tones 50, 52 are placed just outside the signal spectrum a rational fraction of the baud rate B away from the optical signal carrier frequency. N and K are integers selected to put the pilot tone 50, 52 just outside of signal spectrum.

There are several ways to generate the transmitted pilot tone 50, 52. One approach may be to add small modulation components to the drive signals in the digital domain (in the DSP), with a high-speed Digital to Analog Converters (DAC) at the transmitter 16. Another approach to add a pilot tone would be to generate phase shifted RF components (using a 90-degree or 120-degree RF Hybrid or another phase shifter), and add these phase-shifted components to the two driving signals in the analog domain. For example, reference M. Xue et al., "Optical single-sideband modulation based on a dual-drive MZM and a 120° coupler," J. Lightwave Techn., vol. 32, no. 19, October 2014, pp. 3317-3323.

Transmitter

Figure 31:
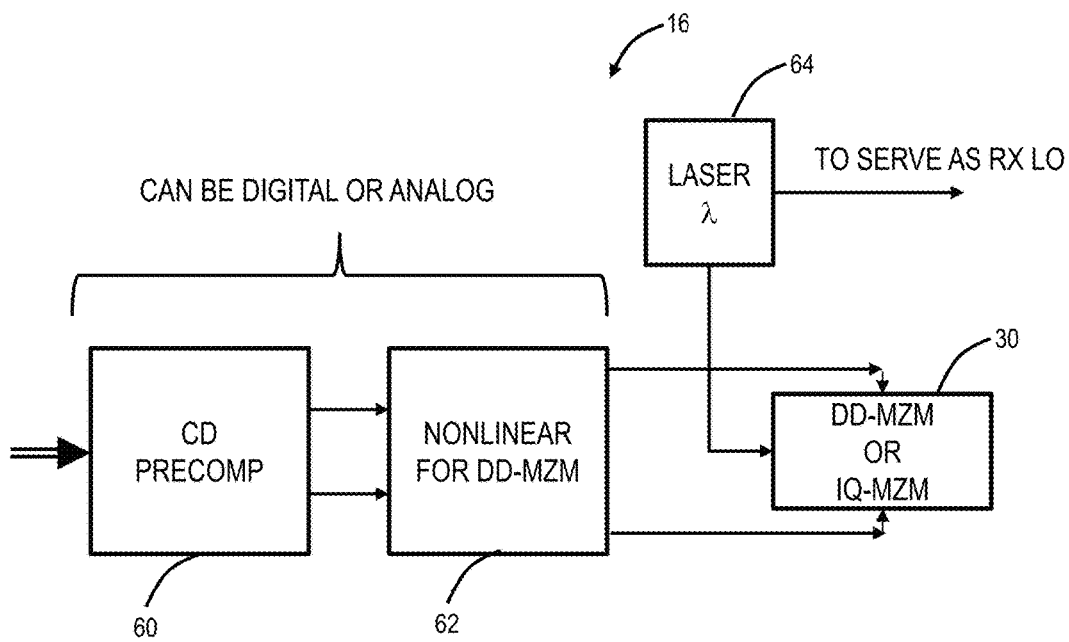
FIG. 31 is a block diagram of the transmitter in the coherent optical transceiver, illustrating a single polarization.

FIG. 31 is a block diagram of the transmitter 16 in the coherent optical transceiver 10, illustrating a single polarization signal generation. It is to be understood that an identical configuration may be used for the orthogonal optical polarization signal generation. As described herein, the transmitter 16 can include the DD-MZM 30, but the transmitter can also include a nested I/Q modulator. The DD-MZM 30 has lower optical insertion loss compared to the nested I/Q modulator which is beneficial for single channel applications. Further, the transmitter 16 can include partial CD compensation 60 and nonlinear compensation 62 for the DD-MZM 30. The compensation 60, 62 can be analog or digital circuits. The CD compensation 60 implements the FIR taps in the transmitter 16, working in conjunction with FIR taps in the receiver 18. An optimized partitioning of FIR filtering between the transmitter 16 and the receiver 18 allows an overall reduction in complexity, and a reduction in Peak to Average Power Ratio (PAPR) on the transmitter 16 side (important for reducing optical loss).

The nonlinear compensation 62 is configured to adjust the constellation and drive voltages as described in FIGS. 6-27. Specifically, the DD-MZM 30 can include a peak to peak drive voltages sufficient to cover full unity circle I/Q plane whereby optical output field transitions across a predefined radial bisection line is prevented by providing drive voltages 46, 48 forcing null transmission. The nonlinear compensation 62 can include a signal pre-distortion filter applied to compensate for constraints on drive voltages 46, 48 forcing null transmission in the DD-MZM 30. An input signal is provided to the partial CD compensation 60, and the nonlinear compensation 62 and the outputs are the drive voltages 46, 48 to the DD-MZM 30.

The CD precompensation via the compensation 60 using the DD-MZM 30 with M-QAM modulation is quite problematic. As described herein, the DD-MZM 30 uses a pair of drive voltages V1, V2 46, 48, such that V1+V2 controls optical phase, and V1−V2 controls signal absolute amplitude. Signals precompensated for chromatic dispersion have transitions that cross the negative I axis. These transitions essentially result in the growth of V1+V2 as optical phase accumulates, while V1−V2 stays roughly constant, i.e., both V1 and V2 increase beyond limits supported by the drivers and the DD-MZM 30.

The compensation 60, 62 includes a novel signal processing approach to provide dispersion pre-compensation using DD-MZM. The approach offsets signal spectrum in the I/Q plane, and forces the pre-distorted drive voltages V1, V2 46, 48, signals to set the DD-MZM 30 at Null rather than undergo a negative I axis crossing. This approach eliminates problems with runaway drive voltage, albeit at the expense of a small SNR degradation.

The transmitter 16 includes a laser 64 at a wavelength λ which connects to the DD-MZM 30 (or the nested I/Q modulator). The laser 64 can be configured to both provide an optical transmission source and a Local Oscillator (LO) for the receiver 18 thereby reducing components and power consumption. The laser frequencies of the laser 64 on the East and West sides of an optical link can be set at an offset >½ signal bandwidth to provide just out of signal spectrum placing when reused for the receiver LO.

The pilot tones 50, 52 can be added to the drive voltages 46, 48. As described herein, the pilot tones 50, 52 can be at a fractional N/K for one polarization and (N+1)/K for the orthogonal polarization of symbol clock outside of signal spectrum on opposite sides of the spectrum for E-W transceivers 10 in a bidirectional link. E-W transceivers refer to "EAST" and "WEST," i.e., adjacent transceivers in the bidirectional link. The pilot tones 50, 52 can be added either in the digital or analog domain depending on the implementation of the compensation 60, 62.

Heterodyne Reception with Coupler (Dual Polarization)

Referring to FIG. 32, in an exemplary embodiment, a block diagram illustrates a heterodyne coherent receiver 70 for the receiver 18. The coherent receiver 70 includes a polarization splitter 72 which splits the two polarizations (X and Y) each to a 3 dB coupler 74 (i.e., optical couplers) along with the LO which is from the laser 64 with an offset. Outputs from each of the 3 dB couplers 74 are provided to a balanced photodetector 76 which respectively output an RF signal for each of the X and Y polarization. The receiver 18 is configured with the 3 dB couplers 74 to coherently combine the received signals and the LO and provide optical outputs for balanced detection.

A 3 dB coupler based balanced coherent receiver is known, as for example a configuration based on concepts described by Kim Roberts and Shahab Oveis Gharan in U.S. Pat. No. 8,805,206, issued Aug. 12, 2014, and entitled "SINGLE PIN COHERENT RECEIVER," the contents of which are incorporated by reference. This patent references a prior-art heterodyne receiver implementation composed of a 3 dB coupler with a balanced photodetector pair, followed by an analog mixer downconverter, followed by an A/D baseband sampler. The drawbacks of this implementation are indicated as degradation due to additional phase and frequency recovery feedback loops associated with RF local oscillator. This configuration also requires narrow linewidth lasers. Further, ADC is still required with high resolution and sampling rate for proper digital signal processing for compensating chromatic dispersion, polarization recovery, etc.

Indeed, a coherent intradyne receiver using an optical 90-degree hybrid front end, followed by an analog processor implemented in 130 nm SiGe process has been proposed and demonstrated. This circuit added a polarization demultiplexing single tap FIR filter, but was unable to compensate for chromatic dispersion. A decision-aided analog Costas loop was used for phase and frequency recovery for RF local oscillator. Overall, this approach did not achieve the requisite performance in chromatic dispersion compensation, design simplicity, power reduction, or noise tolerance. See N. Nambath et al., "Analog domain signal processing-based low-power 100-Gb/s DP-QPSK receiver," J. Lightwave Techn., vol. 33, no. 15, August 2015, pp. 3189-3197.

Analog Feed-forward and decision feedback equalizers were investigated for DP-QPSK optical links with coherent receivers, with a primary goal of compensating small amounts of chromatic dispersion. Designs with a very limited compensation range using 1 and 2 taps were investigated, targeting coherent intradyne receivers with the 90-degree optical hybrid front end. See M. Ratwani et al., "Analog domain decision feedback equalizer for repeater-less DP-QPSK coherent optical links," 2016 $25^{th}$ Wireless and Optical Communication Conference.

There have been several papers that investigated heterodyne type coherent receivers, focusing on optical carrier generated at the transmitter and co-propagated along with data signal. Approaches based on Kramers-Kronig type receivers, as well as heterodyne mixer based receivers implemented either as analog or digital circuits have been demonstrated. The receiver is purely direct-detection without coherent LO combining and this approach is generally limited to a single polarization. It also suffers from self-beating noise, since balanced detection and common mode beating rejection is not possible. See Z. Li, "SSBI Mitigation and the Kramers-Kronig Scheme in Single-Sideband Direct-Detection Transmission with Receiver-based Electronic Dispersion Compensation," J. Lightwave Techn., vol. 35, no. 10, May 2017, pp. 1887-1893 and F. Gutierrez, et al., "WDM orthogonal subcarrier multiplexing," J. Lightwave Techn., vol. 34, no. 8, April 2016, pp. 1815-1823.

The coherent receiver 70 uses a traditional polarization-diversity architecture with the LO being just outside of the signal spectrum past the pilot tones. However, instead of a more traditional 90-degree optical hybrid, the coherent receiver 70 uses the 3 dB couplers 74. The advantage is simpler construction, lower optical loss, the preserved benefit of common mode signal rejection, and only two balanced photodetectors 74 (instead of 4). The drawback is ~2× required photodetector bandwidth. The coherent receiver 70 implements a heterodyne approach with a simple 2×2 coupler instead of a conventional 90-degree optical hybrid. The optical LO signal is added at the receiver 18 to enable dual-polarization data transmission. Optical complexity and loss are reduced but at the expense of 2× wider RF photodetector/TIA bandwidth (½ photodetectors/TIAs, simpler optical coupler, lower laser power).

The coherent receiver 70 is a heterodyne receiver that shifts the spectrum of a signal to intermediate frequency, but effectively preserves the full spectrum of the signal, as shown in FIG. 33. It should be noted that the received X and Y polarizations contain a mixture of original transmitted signal 'h' and 'v' polarizations. The 'h' and 'v' plots are not mixed and separable in frequency, and well-known simple matrix math is used to compute fiber polarization rotation matrix. This matrix is used directly to obtain signal 'h' and 'v' polarizations from the mixed X and Y measurements. Note, Polarization Mode Dispersion (PMD) compensation would require a feedback loop, but is expected to be minimal for low-distance links.

In order to both simplify coherent receiver and provide improved phase and frequency recovery, the use of pilot tones can be quite beneficial. Such pilot tones were used by the inventors here in U.S. Pat. No. 8,699,880, issued Apr. 15, 2014, and entitled "OPTICAL TRANSCEIVERS FOR USE IN FIBER OPTIC COMMUNICATION NETWORKS," the contents of which are incorporated by reference herein. This patent was applied to an intradyne coherent receiver with multiple subcarriers. Such pilot tones can be used to provide information on signal polarization state as well as data clock information using a pure feedforward implementation without the drawbacks of feedback loops. The use of intradyne coherent receiver puts pilot tones at the extreme edges of the signal spectrum and requires very high-frequency mixers to convert them to baseband.

The optical transceiver 10 includes the pilot tones 50, 52 added on each polarization to help with receiver-side recovery of LO phase/frequency and to simplify symbol clock recovery. A much lower cost laser with wider linewidth can be used in this implementation. The receiver optical LO is used on the same side of the spectrum as received pilot tones 50, 52, which reduces pilot mixer frequency demands. Opposite ends of the link position pilots on the opposite sides of the data signal spectrum, and provide lasers offset by > signal bandwidth, such that the same laser can be used for both transmission source and receive side LO.

The RF LO is synthesized directly from the pilot tones 50, 52, using the following frequency relationships (implemented using frequency mixers and frequency multipliers):

$$f_{rf} = f_{ph} + N^*(f_{ph} - f_{pv})$$

Similarly, a data clock B can be synthesized directly from the pilot tones 50, 52, using the following relationship:

$$B = K^*(f_{ph} - f_{pv})$$

Figure 34:
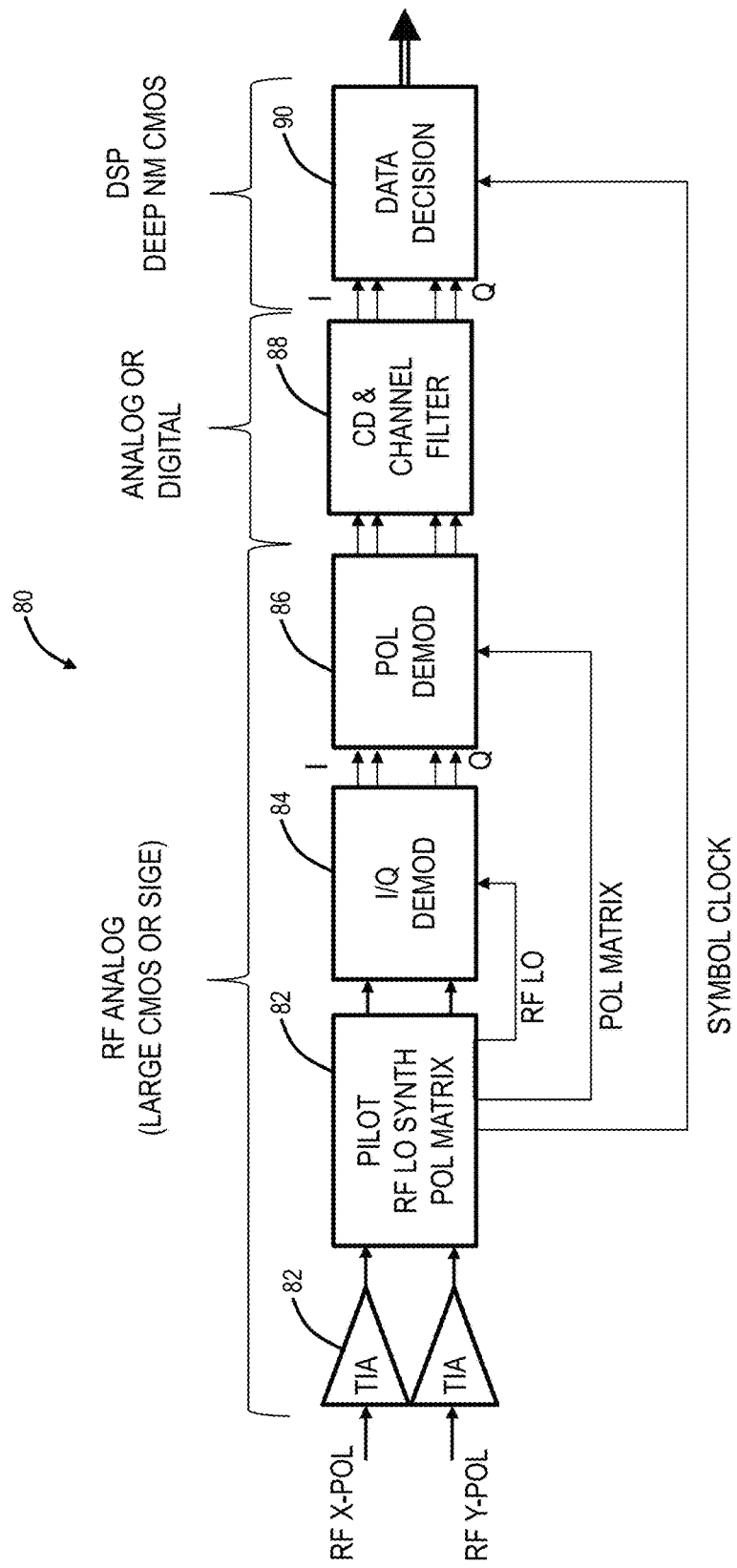
FIG. 34 is a block diagram of an electronic processing block connected to the heterodyne coherent receiver in the receiver.

Referring to FIG. 34, in an exemplary embodiment, a block diagram illustrates an electronic processing block 80 connected to the heterodyne coherent receiver 70 in the receiver 18. The electronic processing block 80 receives the RF signal for each of the X and Y polarization from the heterodyne coherent receiver 70. The electronic processing block 80 includes Transimpedance Amplifiers (TIA) 82 which connects to circuitry 82 for synthesizing the polarization matrix from the pilot tones. The circuitry 82 connects to an I/Q demodulator 84 which connects to a polarization demodulator 84. The polarization demodulator connects to CD and channel filter compensation 88 which provides an output to a data decision circuit 90.

In an exemplary embodiment, the electronic processing block 80 uses an RF Analog front-end for the TIA 82, the circuitry 82, and the demodulators 84, 86, which can be implemented either in SiGe or RF CMOS process. That is, the receiver 18 is further partitioned into an Analog RF front-end which performs signal conversion to baseband, polarization demultiplexing, phase/frequency/clock recovery, and some FIR signal filtering for dispersion and RF channel compensation. Such analog circuits tend to be much simpler and lower in power consumption compared to deep nm CMOS DSP type approaches. Such analog approach is particularly amenable to feed-forward implementations, where minimal signal processing is required. For the feed-forward, the circuitry 82 provides the RF LO to the I/Q demodulator 84, the polarization matrix to the polarization demodulator 86, and a symbol clock to the data decision circuit 90. For example, a 60 GHz, RF radio front-end, implemented in 90-nm CMOS consumes ~140 mW and provides full QPSK signal processing functionality, including signal buffering, LO synthesizer, demodulator, etc.

The RF analog front-end is configured to down-convert the pilot tones 50, 52 and directly synthesize the RF LO for signal conversion to baseband with the corresponding recovery of frequency and phase offsets. The RF analog front-end is further configured to down-convert the pilot tones 50, 52 and directly synthesize symbol clock signal. The RF analog front-end is further configured to down-convert the pilot tones 50, 52 and directly synthesize polarization deconvolution matrix. The RF analog front-end is also further configured to downconvert the received signal to baseband and extract I and Q components and to recover transmitted signal polarizations. Finally, the RF analog front-end is further configured to provide FIR filters for partial compensation of DD-MZM distortion and chromatic dispersion compensation, in cooperation with the transmitter 16. Note, the unused FIR filter taps can be shut-down to conserve power.

The TIA 82 can be included as an additional analog block on the same die as the analog signal processor, e.g., in the same Application Specific Integrated Circuit (ASIC). This both reduces cost and power and improves RF signal transmission from the TIA 82 to the downconverting mixer block.

FIR filtering is used to compensate for some residual amount of Chromatic Dispersion and residual RF channel effects. Such filter can be implemented in the analog domain if a number of required taps is in low double digits, as is the case for short-reach optical links described herein.

The split between analog and digital can be done before or after the CD and channel filter compensation 88. Digitization (ADC) occurs with no oversampling and minimal ENOB, simplifying processing and reducing DSP cost and power consumption. The ADC ENOB is limited to provide hard decision slicing of symbol constellation. The Analog to Digital (ADC) converter front-end would preferentially run at the symbol rate, and be of limited bit resolution. ADC complexity and power consumption are directly proportional to both sampling rate and ENOB, and minimizing both benefits the receiver 18 design. Approximate ADC power consumption scales as below, showing that doubling sampling rate $f_s$ and an extra resolution bit each ~double power (FOM is a constant related to the ADC implementation technology and structure)

$$\text{Power} \sim FOM * f_s * 2^{ENOB}$$

Finally, a simple DSP for the data decision circuit 90 performs analog signal slicing, possible residual filtering, and FEC decoding. The same block outputs decoded signals on a Serializer/Deserializer (SERDES) interface.

Performance Comparison

The following table shows an estimate based on 7 nm CMOS for a conventional Intradyne Coherent Transceiver, as well as a Heterodyne Coherent Transceiver with Analog pre-processor front-end and Pilot Tones for the coherent optical transceiver 10. Of course, there is baseline power associated with common blocks such as SERDES, FEC, etc. that is not affected. However, it is expected to realize in excess of 30% overall power savings, as well as substantial savings in NRE associated with larger CMOS nodes used in Analog circuits. The table shows functional block power consumption estimates for conventional intradyne coherent and for proposed heterodyne with split Analog/Digital receiver implementations. (Digital and DSP blocks assume 7 nm CMOS process).

| Component | Intradyne Coherent 16QAM | Heterodyne analog/digital |
|---|---|---|
| Baud rate | 62.8 Gbaud | |
| SERDES + FEC | 1.4 | 1.4 |
| Ethernet framer/mapper | 0.3 | 0.3 |
| 15% SD FEC | 0.5 | 0.5 |
| Digital modem | 2.3 | Analog: 0.3 Digital: 0/4 |
| ASIC others | 0.3 | 0.3 |
| ADC/DAC | 1.8 | 0 |
| Total 7 nm ASIC power | 6.6 W | 3.2 W |
| Driver | 1.0 | 1.0 |
| Modulator | 0.2 | 0.2 |
| Laser | 2.2 | 1.5 (due to lower loss and higher linewidth tolerance) |
| TIA | 0.8 | 0.8 |
| Total Optics power | 4.2 W | 3.5 W |
| Controller, PLLs | 0.8 | 0.8 |
| DC/DC | 89% efficiency | |
| TOTAL | 13 W | 8.4 W (36% lower) |

The analog signal processing in CMOS is especially attractive as it can provide both sufficient performance and low power consumption. Of note, numerous CMOS implementations targeting 60 GHz wireless radio receivers exist and can be used for the optical coherent receiver analog processing. These receivers, although somewhat different in overall design, do include most of the required building blocks. Frequency specifications are also quite similar, with the exception that radio signal bandwidth is generally smaller, while RF carrier frequency is quite similar. Several examples are described as follows: T. Dinc et al., "A 60 GHz CMOS Full-Duplex Transceiver and Link with Polarization-Based Antenna and RF Cancellation," IEEE JOURNAL OF SOLID-STATE CIRCUITS, VOL. 51, NO. 5, MAY 2016, p. 1125. T. Dinc et al. describe a 60 GHz I/Q receiver and downconverter implemented in 45 nm SOI CMOS and consuming 111 mW, with most power consumption in RF amplifier and buffer stages. TC. Marcu, et al., "A 90 nm CMOS Low-Power 60 GHz Transceiver with Integrated Baseband Circuitry," IEEE JOURNAL OF SOLID-STATE CIRCUITS, VOL. 44, NO. 12, DECEMBER 2009, p. 3434, shows a 60 GHz radio with QPSK modulation, with 138 mW total power consumption, including digital demodulation.

The individual building block power consumption indicates very efficient operation:

| | |
|---|---|
| Mixed signal baseband at 10 Gbps | 12 mW (increases with data rate, but will be implemented in deep nm CMOS in our proposed design) |
| LNA front-end | 18 mW (data rate independent) |
| Mixers | 15.6 mW (data rate independent) |
| VGA | 23 mW (data rate independent) |
| VCO | 9.8 mW (data rate independent) |
| Dividers | 17.3 mW (data rate independent) |
| LO buffers | 36 mW (data rate independent) |
| Bias and Clock Distribution | 6.3 mW (data rate independent) |

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An optical transceiver, comprising:
a transmitter comprising transmitter signal processing circuitry configured to receive a transmit signal and provide two drive voltage signals V1, V2 to a modulator configured to modulate a laser based thereon; and
a receiver comprising i) optical couplers configured to coherently combine received signals with a Local Oscillator (LO) formed by the laser and provide the combined signals to photodetectors for balanced detection, and ii) receiver signal processing circuitry configured to demodulate outputs from the balanced detection, wherein the receiver signal processing circuitry comprises an analog front-end and digital back-end, wherein the laser has a frequency offset based on signal bandwidth to provide a signal carrier for reuse as the LO.

2. The optical transceiver of claim 1, wherein the modulator comprises a Dual-Drive Mach-Zehnder Modulator (DD-MZM) with peak to peak drive voltages of the drive voltage signals V1, V2 sufficient to cover a full unity circle of an I/Q plane.

3. The optical transceiver of claim 2, wherein optical output field transitions across a predefined radial bisection line of the I/Q plane is prevented by providing the drive voltage signals V1, V2 to force null transmission, wherein the transmitter signal processing circuitry is configured to re-set the drive voltage signals V1, V2 for the null transmission.

4. The optical transceiver of claim 3, wherein the transmitter signal processing circuitry is configured to apply chromatic dispersion compensation on the transmit signal.

5. The optical transceiver of claim 1, wherein the transmitter signal processing circuitry is configured to add pilot tones to the transmitted signal, outside of signal spectrum and on opposite sides of the signal spectrum from an adjacent optical transceiver.

6. The optical transceiver of claim 5, wherein a first pilot tone of the pilot tones is at a fractional N/K of symbol clock outside of the signal spectrum, N and K are integers selected to place the pilot tones slightly outside of the signal spectrum, and a second pilot tone of the pilot tones, orthogonal to the first pilot tone, is at (N+1)/K of the symbol clock outside of the signal spectrum.

7. The optical transceiver of claim 1, wherein the analog front-end comprises Transimpedance Amplifiers (TIAs) and analog Radio Frequency (RF) processing functions integrated into a same circuit.

8. The optical transceiver of claim 1, wherein the analog front-end is configured to down-convert pilot tones on the received signals and directly synthesize a Radio Frequency (RF) LO signal for signal conversion to baseband with corresponding recovery of frequency and phase offsets.

9. The optical transceiver of claim 1, wherein the analog front-end is configured to down-convert pilot tones on the received signals and directly synthesize a symbol clock signal.

10. The optical transceiver of claim 1, wherein the analog front-end is configured to down-convert pilot tones on the received signals and directly synthesize a polarization deconvolution matrix.

11. The optical transceiver of claim 1, wherein the analog front-end is configured to down-convert the received signals to baseband and extract I and Q components.

12. The optical transceiver of claim 1, wherein the analog front-end comprises Finite Impulse Response (FIR) filters for partial compensation of chromatic dispersion compensation, in combination with the transmitter signal processing circuitry of an adjacent optical transceiver.

13. The optical transceiver of claim 12, wherein unused FIR filter taps in the analog front-end are shut down to conserve power.

14. The optical transceiver of claim 1, wherein an Analog to Digital Converter (ADC) stage is between the analog front-end and the digital back-end, wherein the ADC stage operates at a symbol rate.

15. The optical transceiver of claim 14, wherein an Effective Number of Bits (ENOB) of the ADC stages is limited to provide hard decision slicing of a symbol constellation.

16. The optical transceiver of claim 1, wherein the digital back-end comprises a Digital Signal Processor (DSP) configured to perform signal decoding and Forward Error Correction (FEC) decoding.

17. The optical transceiver of claim 1, wherein the transmitter and the receiver are housed in a housing compliant to one of Quad Small Form-factor Pluggable (QSFP) Double Density (DD) and Octal Small Form-factor Pluggable (OSFP).

18. An optical transceiver, comprising:
a transmitter comprising transmitter signal processing circuitry configured to receive a transmit signal and provide two drive voltage signals V1, V2 to a modulator configured to modulate a laser based thereon, wherein the transmitter signal processing circuitry is configured to add pilot tones to the transmitted signal, outside of signal spectrum and on opposite sides of the signal spectrum from an adjacent optical transceiver; and
a receiver comprising i) optical couplers configured to coherently combine received signals with a Local Oscillator (LO) formed by the laser and provide the combined signals to photodetectors for balanced detection, and ii) receiver signal processing circuitry configured to demodulate outputs from the balanced detection, wherein the receiver signal processing circuitry comprises an analog front-end and digital back-end.

19. The optical transceiver of claim 18, wherein a first pilot tone of the pilot tones is at a fractional N/K of symbol clock outside of the signal spectrum, N and K are integers selected to place the pilot tones slightly outside of the signal spectrum, and a second pilot tone of the pilot tones, orthogonal to the first pilot tone, is at (N+1)/K of the symbol clock outside of the signal spectrum.

20. An optical transceiver, comprising:
a transmitter comprising transmitter signal processing circuitry configured to receive a transmit signal and provide two drive voltage signals V1, V2 to a modulator configured to modulate a laser based thereon; and
a receiver comprising i) optical couplers configured to coherently combine received signals with a Local Oscillator (LO) formed by the laser and provide the combined signals to photodetectors for balanced detection, and ii) receiver signal processing circuitry configured to demodulate outputs from the balanced detection, wherein the receiver signal processing circuitry comprises an analog front-end and digital back-end,
wherein the analog front-end comprises Finite Impulse Response (FIR) filters for partial compensation of chromatic dispersion compensation, in combination with the transmitter signal processing circuitry of an adjacent optical transceiver.

\* \* \* \* \*